US012623773B2

(12) United States Patent

Nadel et al.

(10) Patent No.: US 12,623,773 B2

(45) Date of Patent: May 12, 2026

(54) TUNABLE BLADE ASSEMBLY, A BLADE ASSEMBLY, AND A METHOD OF CONTROLLING VIBRATION

(71) Applicant: The Boeing Company, Arlington, VA (US)

(72) Inventors: Adam Ian Nadel, Vienna, VA (US); Lauren Marie Butt, Roanoke, VA (US); Matthew Krott, Reston, VA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 19/222,764

(22) Filed: May 29, 2025

(65) Prior Publication Data

US 2025/0289566 A1 Sep. 18, 2025

Related U.S. Application Data

(63) Continuation of application No. 18/590,391, filed on Feb. 28, 2024, now Pat. No. 12,344,370.

(51) Int. Cl.
B64C 27/00 (2006.01)
B64C 27/473 (2006.01)

(52) U.S. Cl.
CPC .......... B64C 27/001 (2013.01); B64C 27/473 (2013.01); B64C 2027/004 (2013.01)

(58) Field of Classification Search
CPC ....... B64C 11/16; B64C 11/20; B64C 27/001; B64C 27/46; B64C 27/473; B64C 2027/004
See application file for complete search history.

(56) References Cited

U.S. PATENT DOCUMENTS

| | | | |
|---|---|---|---|
| 8,226,364 B2 | 7/2012 | Manfredotti et al. | |
| 8,499,907 B2 | 8/2013 | Smith et al. | |
| 9,879,551 B2 * | 1/2018 | Blaney ..................... | F01D 5/18 |
| 10,723,448 B2 | 7/2020 | Paulson et al. | |
| 10,822,965 B2 * | 11/2020 | MacMahon ............... | F01D 5/10 |
| 11,254,424 B2 | 2/2022 | Baldwin et al. | |
| 11,719,301 B2 * | 8/2023 | Romano ................... | F16F 7/10 244/133 |
| 12,344,370 B1 | 7/2025 | Nadel et al. | |
| 2013/0062456 A1 * | 3/2013 | McCollough ......... | B64C 27/473 244/17.11 |

(Continued)

OTHER PUBLICATIONS

Wikipedia, "Sikorsky X2," edited Dec. 25, 2023, 8 pages. Retrieved from the Internet <URL: https://en. wikipedia.org/w/index.php? title=Sikorsky_X2&oldid=1191809359>.

(Continued)

*Primary Examiner* — Sang K Kim
(74) *Attorney, Agent, or Firm* — Hanley, Flight & Zimmerman, LLC

(57) ABSTRACT

An example blade assembly includes a blade extending along a longitudinal axis between a root end and a tip end spaced from the root end, wherein: the blade is configured to rotate concurrently with a hub and rotation of the blade generates vibrations in the blade, and the blade defines a cavity spaced from the tip end; and a tunable control assembly including a mass adjustable inside of the cavity of the blade to reduce the vibrations in the blade.

7 Claims, 9 Drawing Sheets

(56) References Cited

U.S. PATENT DOCUMENTS

| | | | |
|---|---|---|---|
| 2015/0104314 A1 | 4/2015 | Zamponi et al. | |
| 2017/0036758 A1 | 2/2017 | Nussenblatt et al. | |
| 2018/0135728 A1* | 5/2018 | Paulson | B64C 11/008 |
| 2019/0154106 A1* | 5/2019 | Heverly, II | B06B 1/183 |
| 2024/0359794 A1* | 10/2024 | Chandrasekaran ... | B64C 27/001 |
| 2024/0375763 A1* | 11/2024 | Chakrabarti | B64C 11/008 |

OTHER PUBLICATIONS

United States Patent and Trademark Office, "Non-Final Office Action," issued in connection with U.S. Appl. No. 18/590,391, dated Jun. 21, 2024, 13 pages.

Datta, A. et al., "Experimental Investigation and Fundamental Understanding of a Slowed UH-60A Rotor at High Advance Ratios," NASA, NASA Technical Reports Server [serialonline], May 3, 2011, 26 pages. Retrieved from the Internet: <URL: https://ntrs.nasa.gov/api/citations/20110014334/downloads/20110014334.pdf>.

United States Patent and Trademark Office, "Final Office Action," issued in connection with U.S. Appl. No. 18/590,391, dated Jan. 8, 2025, 15 pages.

United States Patent and Trademark Office, "Applicant-Initiated Interview Summary," issued in connection with U.S. Appl. No. 18/590,391, dated Feb. 10, 2025, 2 pages.

United States Patent and Trademark Office, "Notice of Allowance and Fee(s) Due," issued in connection with U.S. Appl. No. 18/590,391, dated Mar. 10, 2025, 10 pages.

Blackwell, R. et al., "Dynamics Design Characteristics of the Sikorsky X2 Technology™ Demonstrator Aircraft," 64th Annual Forum of the American Helicopter Society, Montreal, Canada, Apr. 29-May 1, 2008, pp. 886-898, 14 pages [online], [retrieved on Oct. 12, 2016]. ISSN: 1552-2938.

Bagai, A., "Aerodynamic Design of the X2 Technology Demonstrator™ Main Rotor Blade," 64th Annual Forum of the American Helicopter Society, Montreal, Canada, Apr. 29-May 1, 2008, 16 pages.

* cited by examiner

TUNABLE BLADE ASSEMBLY, A BLADE ASSEMBLY, AND A METHOD OF CONTROLLING VIBRATION

RELATED APPLICATION

This patent arises from a continuation of U.S. patent application Ser. No. 18/590,391, filed on Feb. 28, 2024, which is hereby incorporated herein by reference in its entirety.

BACKGROUND

Many different flight vehicles use rotatable blades to propel the vehicle. The blades are fabricated in a predetermined shape, weight, and stiffness, which produces blades having a predefined natural frequency. During operation of the flight vehicle, the blades are excited by external forces which causes the blades to vibrate. Vibration of the blades may become excessive if the rotating speed and/or excitation of the blades approaches or coincides with the predefined natural frequency of the respective blades.

SUMMARY

Therefore, it is desirable to develop a tunable blade assembly in which a mass within a blade is adjustable to reduce vibrations of the blade during operation of a flight vehicle.

The present disclosure provides a tunable blade assembly for a flight vehicle. The tunable blade assembly includes a hub rotatable about a central axis. The tunable blade assembly also includes a blade extending along a longitudinal axis between a root end and a tip end, with the tip end spaced from the hub. The longitudinal axis is transverse to the central axis. The blade is coupled to the hub at the root end such that the blade is rotatable concurrently with the hub and rotation of the blade generates vibrations in the blade. The blade defines a cavity spaced from the tip end. The tunable blade assembly further includes a tunable control assembly which includes a mass adjustable inside of the cavity of the blade to reduce the vibrations in the blade.

The present disclosure also provides a blade assembly coupled to a hub of a flight vehicle. The blade assembly includes a blade extending along a longitudinal axis between a root end and a tip end spaced from the root end. The blade is configured to rotate concurrently with the hub and rotation of the blade generates vibrations in the blade. The blade defines a cavity spaced from the tip end. The blade assembly also includes a tunable control assembly which includes a mass adjustable inside of the cavity of the blade to reduce the vibrations in the blade.

The present disclosure further provides a method of controlling vibration of a tunable blade assembly for a flight vehicle. The method includes determining, via a controller, the vibration of a blade of the tunable blade assembly in response to rotation of the blade via a hub. The blade extends along a longitudinal axis between a root end and a tip end, with the tip end spaced from the hub. The hub and the blade are rotatable about a central axis, and the longitudinal axis is transverse to the central axis. The blade is coupled to the hub at the root end, and the blade defines a cavity spaced from the tip end. The method also includes determining, via the controller, if a threshold of the vibration is reached. The method further includes activating, via the controller, an actuator in response to the threshold of the vibration being reached. In addition, the method includes adjusting a mass inside of the cavity of the blade, via the actuator, to reduce the vibration of the blade.

The detailed description and the drawings or FIGS. are supportive and descriptive of the disclosure, but the claim scope of the disclosure is defined solely by the claims. While some of the best modes and other configurations for carrying out the claims have been described in detail, various alternative designs and configurations exist for practicing the disclosure defined in the appended claims.

Figure 1:
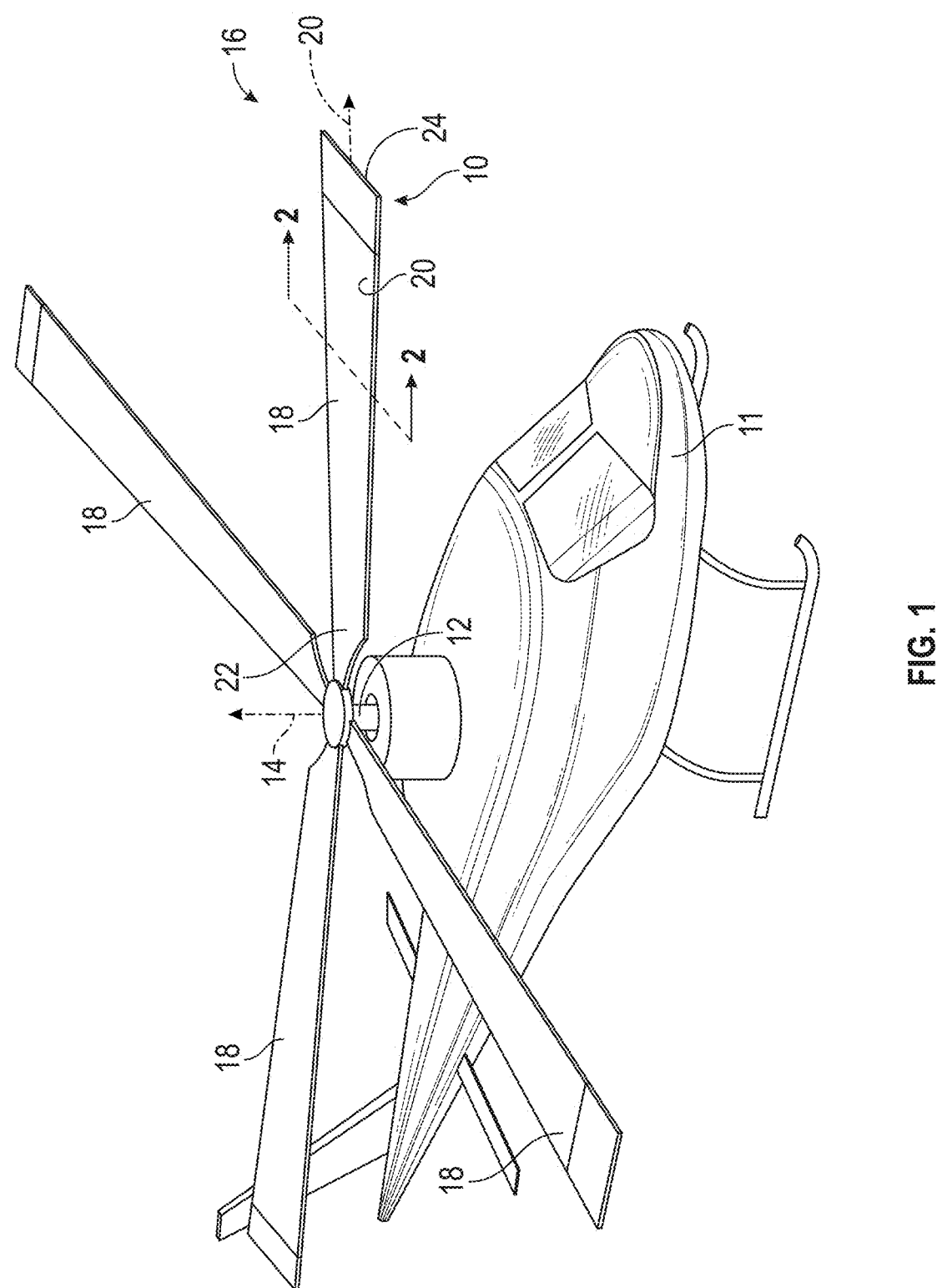
FIG. 1 is a schematic perspective view of a flight vehicle including a tunable blade assembly and a blade assembly.

The present disclosure may be extended to modifications and alternative forms, with representative configurations shown by way of example in the drawings and described in detail below. Inventive aspects of the disclosure are not limited to the disclosed configurations. Rather, the present disclosure is intended to cover modifications, equivalents, combinations, and alternatives falling within the scope of the disclosure as defined by the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims. Moreover, terms such as "first," "second," "third," and so on, may be used to describe separate components. Such terminology may include the words specifically mentioned above, derivatives thereof, and words of similar import.

Furthermore, the term "substantially" can refer to a slight imprecision or slight variance of a condition, quantity, value, or dimension, etc., some of which are within manufacturing variance or tolerance ranges.

As used herein, an element or step recited in the singular and preceded by the word "a" or "an" should be understood as not necessarily excluding the plural of the elements or steps. Further, any reference to "one configuration" is not intended to be interpreted as excluding the existence of additional configurations that also incorporate the recited features. Moreover, unless explicitly stated to the contrary, configurations "comprising" or "having" an element or a plurality of elements having a particular property may include additional elements not having that property. The phrase "at least one of" as used herein should be construed to include the non-exclusive logical "or", i.e., A and/or B and so on, depending on the number of components.

Referring to the figures, wherein like numerals indicate like or corresponding parts throughout the several views, a tunable blade assembly 10 for a structure, such as a flight vehicle 11 is generally shown in FIG. 1. The tunable blade assembly 10 includes a hub 12 rotatable about a central axis 14. The hub 12 may be rotatable relative to a fixed structure, The structure may be any suitable configuration, and non-limiting examples of the structure may include a wind turbine, a flight vehicle 11, or any other structure suitable to support the tunable blade. The flight vehicle 11 may be any suitable configuration, and non-limiting examples may include aircraft, drones, rotorcraft, payloads, etc. Therefore, for example, the flight vehicle 11 may include a rotary-wing aircraft, a helicopter, a prop aircraft, a fixed wing aircraft, a tilt-wing aircraft, etc., or any other desirable flight vehicle.

The hub 12 is configured to be compatible with the desired structure, such as the flight vehicle 11. Therefore, depending on the type of structure, e.g., the flight vehicle 11, the hub 12 may be coupled to a rotor or be part of the rotor. A propulsor, including but not limited to a motor or an engine or any other suitable power source, may be coupled to the hub 12 to drive the hub 12, i.e., rotate the hub 12.

Figure 2:
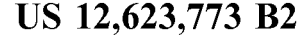
FIG. 2 is a schematic cross-section view of a blade taken from lines 2-2 of FIG. 1, illustrating a tunable control assembly therein.

Referring to FIGS. 1 and 2, the tunable blade assembly 10 also includes a blade 18 extending along a longitudinal axis 20 between a root end 22 and a tip end 24, with the tip end 24 spaced from the hub 12. As best shown in FIG. 2, the longitudinal axis 20 extends along the span of the blade 18. Generally, the longitudinal axis 20 is transverse to the central axis 14. As best shown in FIG. 1, the blade 18 is coupled to the hub 12 at the root end 22 such that the blade 18 is rotatable concurrently with the hub 12. FIG. 1 illustrates a plurality of blades 18 coupled to the hub 12, but it is to be appreciated that any suitable number of blades 18 may be utilized in the tunable blade assembly 10. For illustrative purposes, one blade 18 is discussed below, but it is to be appreciated that one or more or all of the blades 18 may include the features described herein for tuning the blade 18. Therefore, FIG. 1 is also illustrative of a blade assembly 16 coupled to the hub 12 of the flight vehicle 11, in which the blade 18, and associated features, are part of the blade assembly 16. For example, when referring to FIG. 1, four blades 18 are shown, and one of these blades 16 may be tuned, more than one of these blades 16 may be tuned, or all four of the blades 16 may be tuned.

Referring to FIGS. 1 and 2, the blade 18 includes an outer surface 26 having a predetermined configuration. The configuration of the outer surface 26 may be different depending on the desired structure using the tunable blade, e.g., the flight vehicle 11. Generally, the blade 18 may include a leading edge 28 and a trailing edge 30 spaced apart from each other relative to a chord axis 32 that is transverse to the longitudinal axis 20. Therefore, a chord 34 of the blade 18 is the distance between the leading edge 28 and the trailing edge 30 along the chord axis 32. In certain configurations, the blade 18 may include a spar 36 disposed between the leading edge 28 and the trailing edge 30. The spar 36 may be elongated along the longitudinal axis 20, and the spar 36 may define a space 38 extending along the longitudinal axis 20.

The blade 18 is configured to be compatible with the hub 12 of the desired structure, e.g., the flight vehicle 11. Therefore, the blade 18 may be any suitable configuration such as a blade, a propeller, or any other suitable rotatable structure which may include rotatable structures that provides, enables, or facilitates flight of the desired flight vehicle 11. As discussed above, the outer surface 26 of the blade 18 is formed having a predetermined configuration, and thus, the outer surface 26 may be formed having a predetermined shape depending on the desired structure, e.g., the flight vehicle 11.

The blade 18 may be fabricated having a predetermined stiffness and predetermined weight depending on the desired structure, e.g., the flight vehicle 11. By incorporating the tunable blade assembly 10 described herein, optionally, the blade 18 is tunable, which may occur prior to, during, or after use of the structure, e.g., the flight vehicle 11. For example, the weight of the blade 18 may be adjusted prior to or after flight of the flight vehicle 11, or adjusted during flight of the flight vehicle 11, which is discussed further below.

Generally, the shape, the weight, and the stiffness of the blade 18 causes the blade 18 to produce a natural frequency at which the blade 18 will vibrate if excited by external forces. During operation of the flight vehicle 11, rotation of the blade 18 generates vibrations in the blade 18 due to the blades 18 being excited by the external forces. Vibration of the blade 18 may be excessive if a rotating speed and/or excitation of the blade 18 approaches or coincides with the natural frequency of the blade 18, i.e., resonant frequency. Therefore, the tunable blade assembly 10 described herein beneficially controls or reduces vibration of the blade 18 to prevent excessive vibration of the blade 18, such as changing the resonant frequency of the blade 18, which may provide improved performance, increase the structural life of the blade 18, and/or improve passenger ride experience of the structure, such as the flight vehicle 11. As such, the blade 18 may be tuned to change the natural frequency and reduce vibrations, which is discussed further below.

Turning back to the features of the blade 18, referring to FIGS. 3-9, the blade 18 defines a cavity 40 spaced from the tip end 24 (tip end numbered in FIG. 1). That is, the cavity 40 is contained inside of the blade 18. Generally, the cavity 40 may extend longitudinally inside of the blade 18. That is, the cavity 40 extends along the longitudinal axis 20 between a proximal end 42 and a distal end 44. In other words, the cavity 40 extends along a portion of the span of the blade 18. The proximal end 42 is disposed closer to the root end 22 of the blade 18 than the proximal end 42 is to the tip end 24 of the blade 18. Furthermore, the distal end 44 is disposed closer to the tip end 24 of the blade 18 than the distal end 44 is to the root end 22 of the blade 18.

As best shown in FIGS. 3-9, the tunable blade assembly 10 includes a tunable control assembly 46 that provides a way to tune the blade 18 to control vibration of the blade 18. The tunable control assembly 46 includes a mass 48 adjustable inside of the cavity 40 of the blade 18 to reduce vibrations in the blade 18 due to rotation of the blade 18 via the hub 12. For example, the mass 48 may be adjustable by increasing the mass 48 inside of the cavity 40 or decreasing the mass 48 inside of the cavity 40, which is illustrated in FIGS. 3-7. As other examples, the mass 48 may be adjustable by moving the mass 48 to different locations inside of the cavity 40, which is illustrated in FIGS. 3-9. Therefore, the blade 18 may be tuned by changing the natural frequency of the blade 18, and to do so, the mass 48 or weight inside of the blade 18 is adjusted, by, for example, changing the amount of mass 48 or weight inside of the blade 18 and/or moving the mass 48 or weight to a different location inside of the blade 18. Generally, the blade assembly 16 may include the blade 18 and the tunable control assembly 46 as discussed herein.

Therefore, by changing the weight of the blade 18 (i.e., increasing or decreasing the mass 48) and/or by moving the mass 48 to different locations in the blade 18, the natural frequency of the blade 18 may be changed, which correspondingly changes vibration interactions with the blade 18 or other structures of the flight vehicle 11, such as an airframe, mounts, the motor that drives rotation of the blade 18, etc. Also, by reducing vibratory loads, the overall weight of the flight vehicle 11 may be reduced because vehicle design parameters would not have to account for larger vibratory loads, and/or improve passenger ride experience of the structure, such as the flight vehicle 11. Furthermore, over time, the blade 18 may wear, and by tuning the blade 18 as described herein, the structural life of the blade 18 may be extended.

The mass 48 may be in any suitable form, and non-limiting examples may include an adjustable mass (see FIGS. 3-7) or a fixed mass (see FIGS. 8 and 9), and these examples will be discussed below.

In certain configurations, the mass 48 is formed of the adjustable mass in which a weight of the adjustable mass is adjustable, i.e., the weight of the adjustable mass is changeable. That is, the adjustable mass is a variable volume inside of the blade 18. In certain configurations, the adjustable mass may be formed of a liquid mass, and one non-limiting example of the liquid mass of the adjustable mass may include a heavy weighted fluid to provide enough weight to change the natural frequency of the blade 18. Other non-limiting examples of the liquid mass of the adjustable mass may include hydraulic fluid, oil, coolant, etc.

Alternatively, the mass 48 is formed of the fixed mass, i.e., the weight of the fixed mass does not change. That is, the fixed mass is a non-variable volume regardless of whether the fixed mass is in a solid form and/or a liquid form. In certain configurations, the fixed mass may be formed of a solid mass, and non-limiting examples of the solid mass may include one or more metals, tungsten, lead, steel, polymers, and combinations thereof. As another example, the fixed mass may be a liquid mass contained in a container, in which the weight of the fixed liquid mass remains the same, i.e., the weight of the fixed liquid mass in the container does not change, and non-limiting examples of the liquid mass of the fixed mass may include hydraulic fluid, oil, coolant, etc. In certain configurations, the fixed mass may include both a solid mass and a liquid mass.

In certain configurations, the cavity 40 of the blade 18 is disposed in the spar 36, and for example, the cavity 40 may be disposed inside of the space 38 of the spar 36. In other configurations, the cavity 40 may be disposed outside of the spar 36. Therefore, optionally, the spar 36 may form a housing 50 that contains the cavity 40. In other configurations, the tunable control assembly 46 may include a housing 50 that is separate from the spar 36 such that the housing 50 is disposed inside of the space 38 of the spar 36, or outside of the spar 36, but regardless of the location, the housing 50 defines the cavity 40. Furthermore, regardless of whether the spar 36 forms the housing 50 or not, the mass 48 is contained in the cavity 40 inside of the blade 18.

As mentioned above, the mass 48 may be adjustable by increasing the mass 48 inside of the cavity 40 or decreasing the mass 48 inside of the cavity 40, which is illustrated in FIGS. 3-7. As also mentioned above, the mass 48 may be adjustable by moving the mass 48 to different locations inside of the cavity 40, which is illustrated in FIGS. 3-9. Therefore, depending on the desired configuration of the tunable control assembly 46, the location of the mass 48 may be changed, the amount of mass 48 may be changed, or the location of the mass 48 and the amount of mass 48 may both be changed. Depending on the adjustment of the mass 48, a center of gravity 51 of the mass 48 relative to the cavity 40 may be changed, and the example figure illustrations show the center of gravity 51 of the mass 48 changing. In addition, depending on the adjustment of the mass 48, a center of gravity 52 of the blade 18 may correspondingly change, and the example figure illustrations show the center of gravity 52 of the blade changing. Therefore, the blade 18 may be tuned in flight, which may beneficially remove or reduce imbalanced loads.

Figure 3:
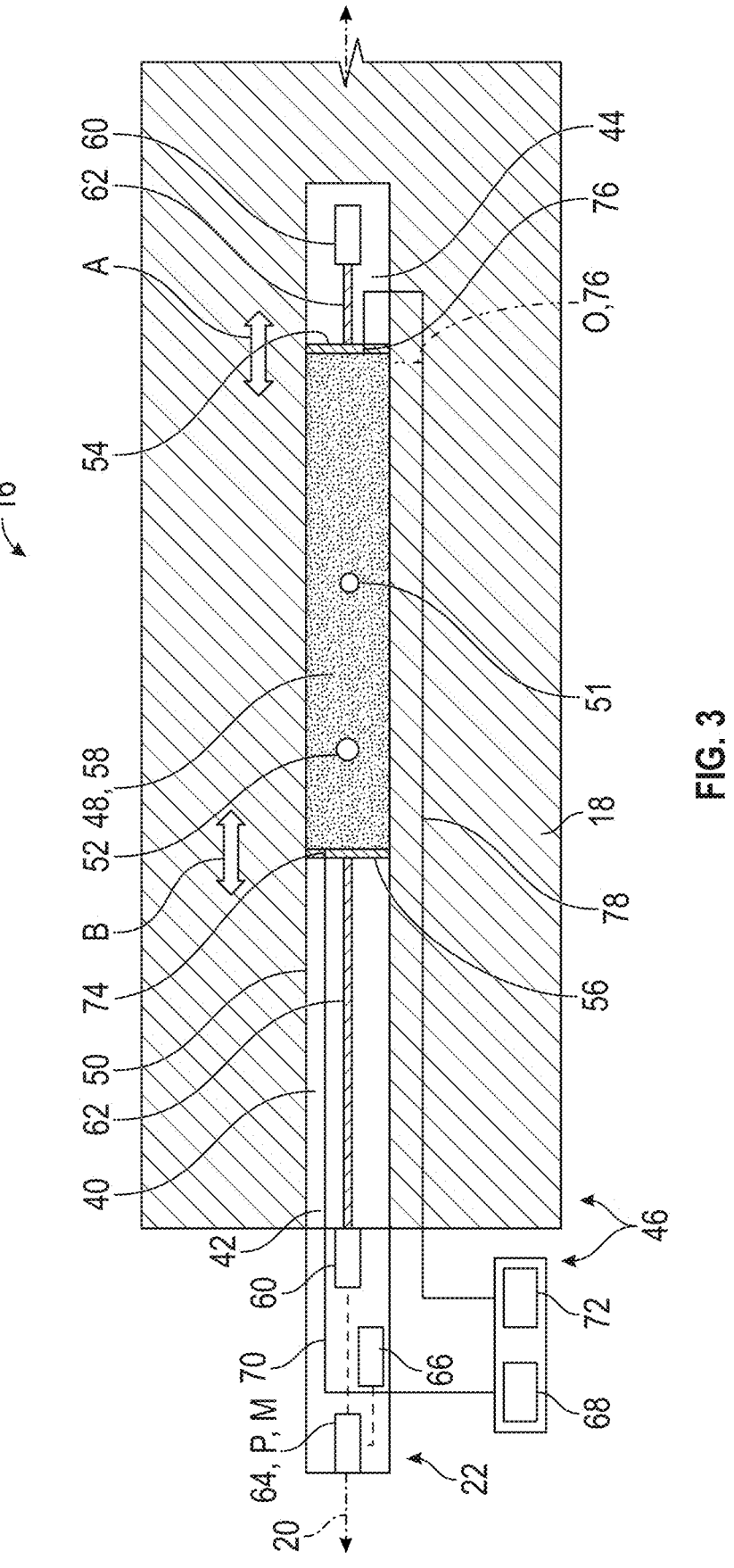
FIG. 3 is a schematic illustration of the blade including an example configuration of the tunable control assembly suitable with the configurations of FIGS. 1 and 2, the tunable control assembly including a mass of a first size and a first location inside of the blade.
Figure 4:
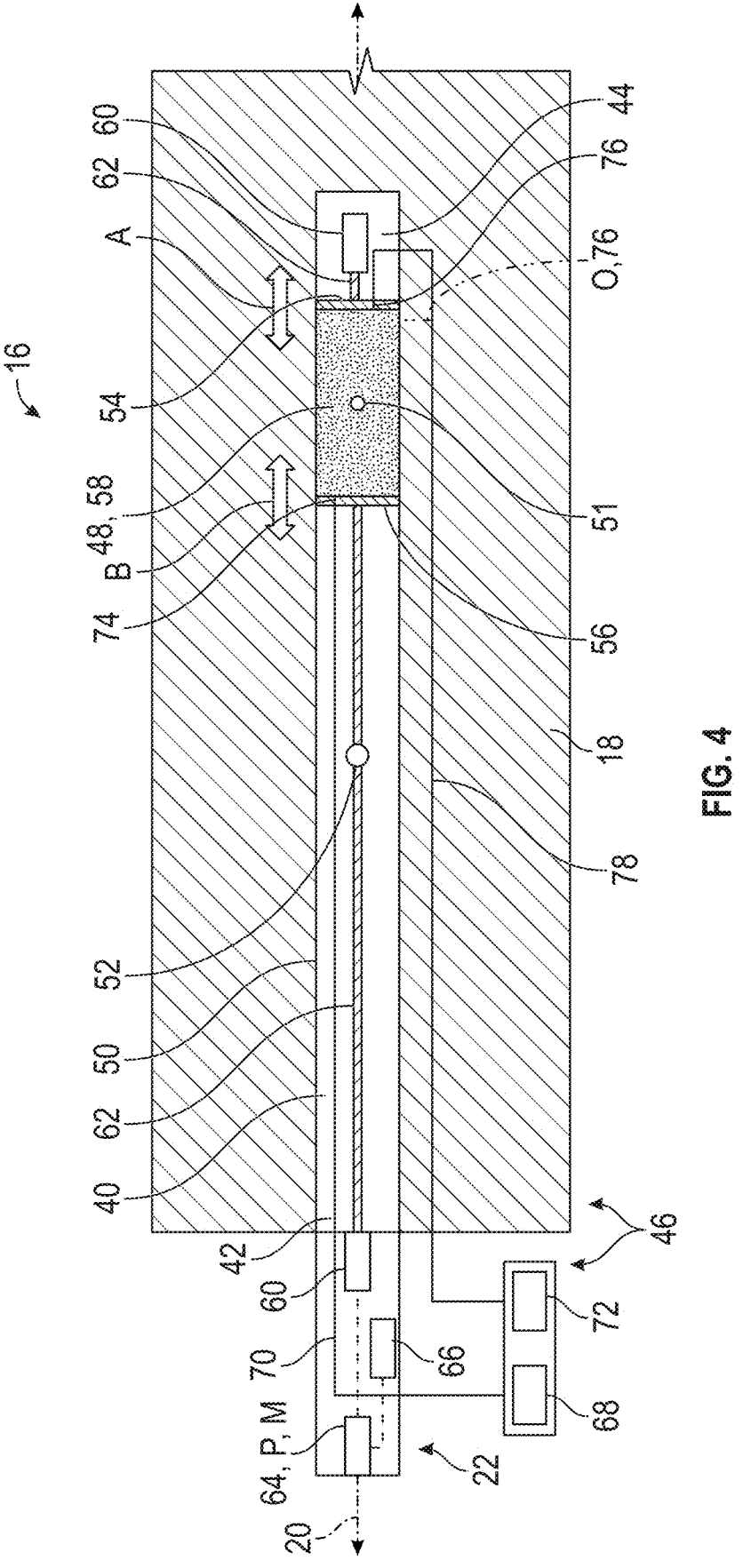
FIG. 4 is a schematic illustration of the blade and the tunable control assembly of FIG. 3, illustrating the mass of a second size and a second location inside of the blade.

Comparing FIGS. 3 and 4, the mass 48 may be adjustable by increasing the mass 48 inside of the cavity 40 to a first adjusted mass and the mass 48 may be adjustable by decreasing the mass 48 inside of the cavity 40 to a second adjusted mass. That is, the amount of mass 48 may be changed, as illustrated in FIGS. 3 and 4, which, in these examples, correspondingly changes the center of gravity 51 of the mass 48 and changes the center of gravity 52 of the blade 18, and thus, changes the natural frequency of the blade 18. The configurations of FIGS. 5-7 may also adjust the mass 48 by increasing or decreasing the mass 48 inside of the cavity 40, which, in these examples, correspondingly changes the center of gravity 51 of the mass 48 and changes the center of gravity 52 of the blade 18, and thus, changes the natural frequency of the blade 18.

Continuing with comparing FIGS. 3 and 4, the mass 48 may be adjustable by changing the location of the mass 48 inside of the cavity 40, which correspondingly changes the center of gravity 51 of the mass 48 and correspondingly changes the center of gravity 52 of the blade 18. In addition, the configurations of FIGS. 8 and 9 may also adjust the mass 48 by changing the location of the mass 48 inside of the cavity 40, which may correspondingly change the center of gravity 51 of the mass 48 and correspondingly change the center of gravity 52 of the blade 18.

Next the features of how the mass 48 is adjusted are discussed, which tunes the blade 18. Referring to FIGS. 3-7, the tunable control assembly 46 may include a first wall 54 disposed inside of the cavity 40 to define a first boundary of the cavity 40 that houses the mass 48. In addition, the tunable control assembly 46 may include a second wall 56 disposed inside of the cavity 40 to define a second boundary of the cavity 40 that houses the mass 48.

Generally, the first wall 54 and the second wall 56 are spaced apart from each other to define a containment area 58. The mass 48 is disposed between the first wall 54 and the second wall 56 in the containment area 58. Therefore, the housing 50 may cooperate with the first wall 54 and the second wall 56 to close ends of the containment area 58. The mass 48 may completely fill the containment area 58 or the mass 48 may partially fill the containment area 58. The containment area 58 may contain the liquid fluid, and centrifugal force due to rotation of the blade 18 causes the liquid fluid to move toward the first wall 54 (i.e., move outwardly in a direction toward the tip end 24), and due to this, a portion of the containment area 58 might not contain the liquid fluid.

Referring to FIGS. 3-6, in certain configurations, both of the first wall 54 and the second wall 56 may be movable. That is, the first wall 54 and the second wall 56 are movable relative to each other to change a location of the first boundary and a location of the second boundary inside of the cavity 40 to change the volume of the containment area 58 to accommodate the first adjusted mass or the second adjusted mass. As shown in FIGS. 3-6, changing the volume of the containment area 58 may cause the center of gravity 51 of the mass 48 to correspondingly change and cause the center of gravity 52 of the blade 18 to correspondingly change, depending on the change.

To adjust the mass 48 inside of the blade 18, the tunable control assembly 46 may include an actuator 60, which may be referred to as a first actuator 60 herein. The actuator 60 may actively adjust the mass 48. If the mass 48 is contained between the first wall 54 and the second wall 56, actuation of the actuator 60 may move the first wall 54 and/or the second wall 56 relative to the housing 50 to change the containment area 58. FIGS. 3-7 illustrate optional configurations of the actuator 60 moving the first wall 54 and/or the second wall 56. Arrows A, B in FIGS. 3-7 are illustrative of example directions of movement of the first wall 54 and/or the second wall 56.

Figure 6:
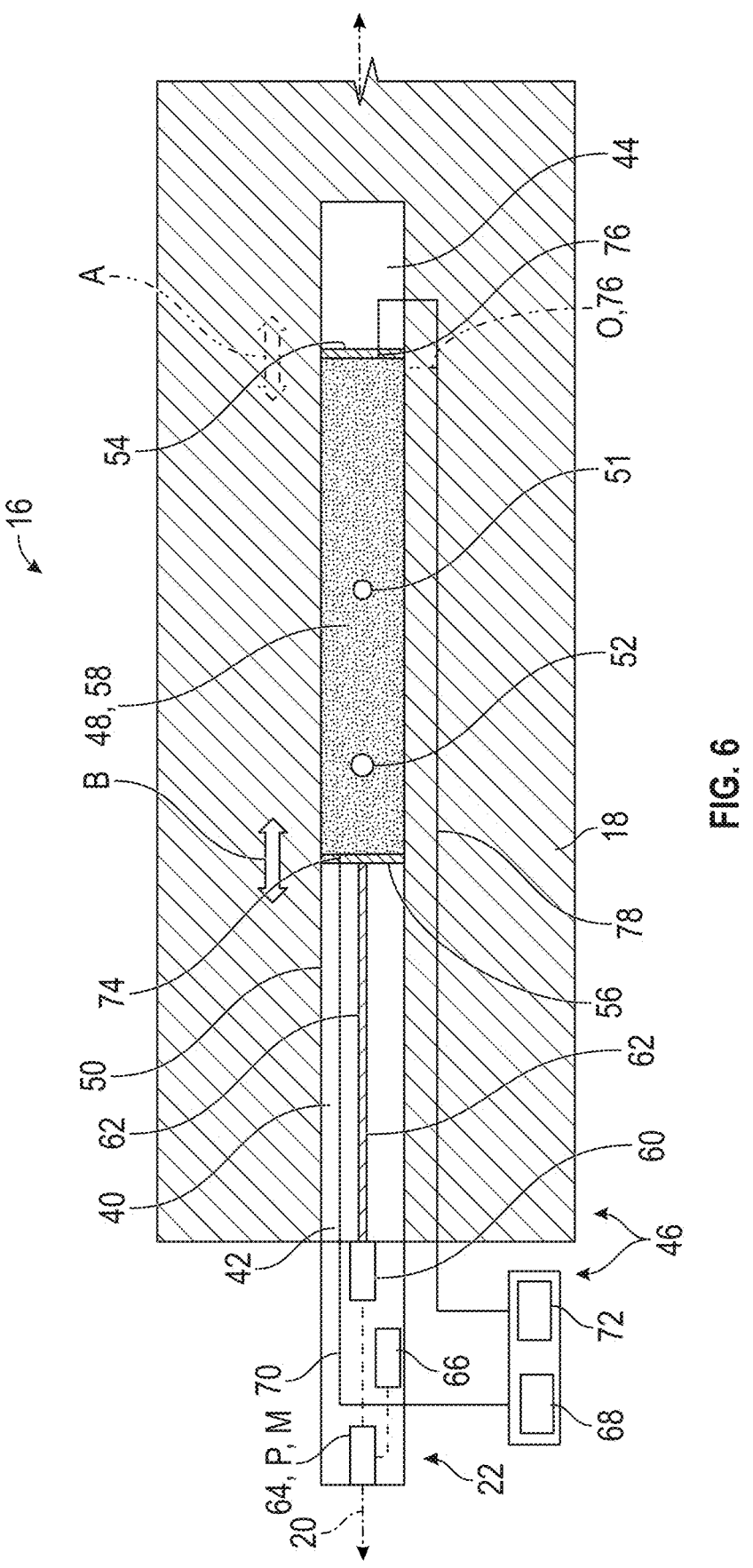
FIG. 6 is a schematic illustration of the blade including yet another example configuration of the tunable control assembly suitable with the configurations of FIGS. 1 and 2.
Figure 7:
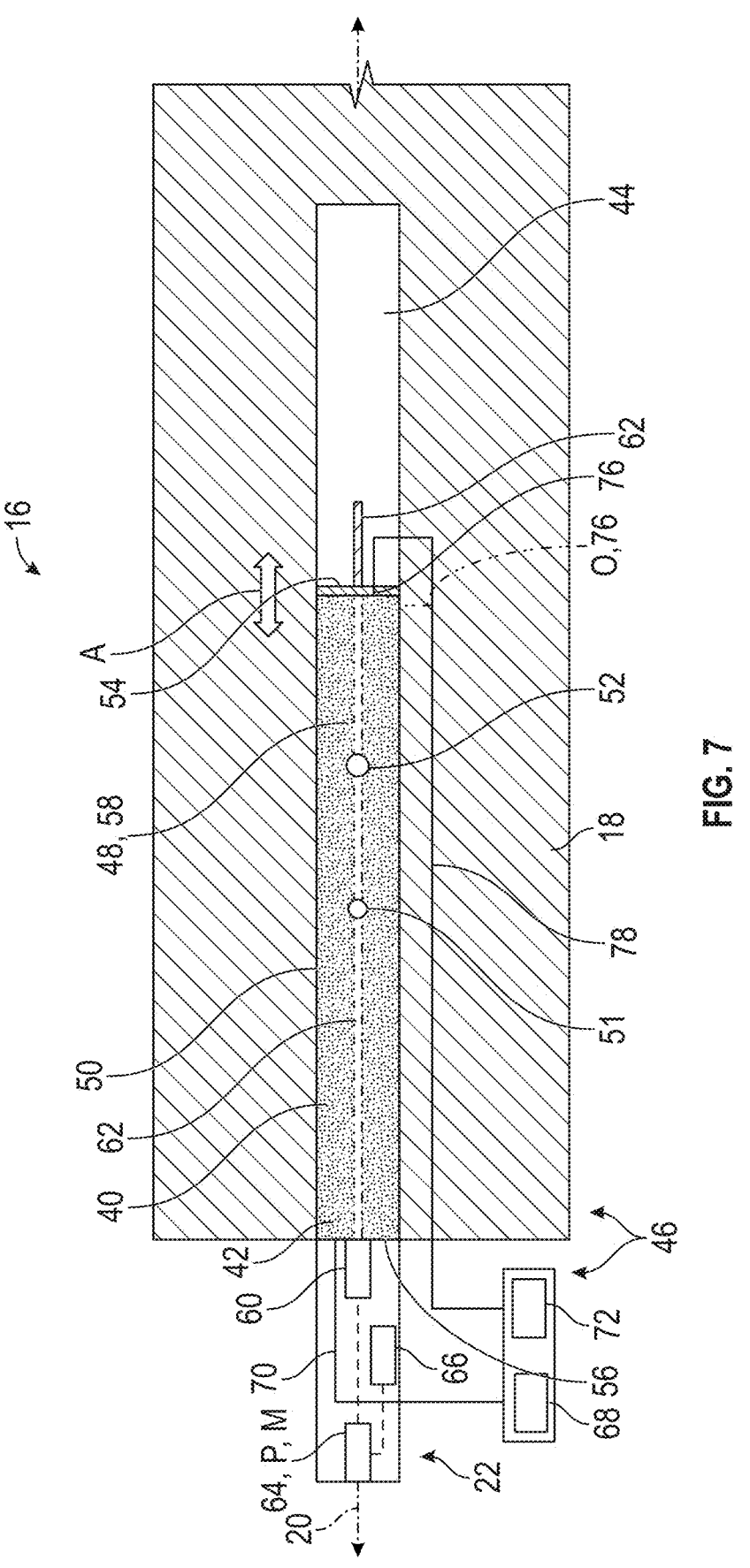
FIG. 7 is a schematic illustration of the blade including another example configuration of the tunable control assembly suitable with the configurations of FIGS. 1 and 2.

In certain configurations, one of the first wall 54 or the second wall 56 is stationary or in a fixed location, while the other one of the first wall 54 or the second wall 56 is movable. For example, optionally, as shown in FIG. 6, the first wall 54 may be stationary and the second wall 56 may be movable relative to the first wall 54 to change a volume of the containment area 58 to accommodate the first adjusted mass or the second adjusted mass. Alternatively, as shown in FIG. 7, optionally, the second wall 56 may be stationary and the first wall 54 may be movable relative to the second wall 56 to change the volume of the containment area 58 to accommodate the first adjusted mass or the second adjusted mass. In both of the examples of FIGS. 6 and 7, one actuator 60 may be used to change the volume of the containment area 58.

Continuing with the example of FIG. 6, two arrows A, B are illustrated, one arrow B in solid lines to indicate that the second wall 56 is movable, and another arrow A in dash-dot-dot-dash lines to indicate that the first wall 54 may be stationary or fixed (i.e., not movable) in certain configuration, while in other configurations, the first wall 54 may be movable. Therefore, FIG. 6 is illustrative of a single actuator 60 that may move both of the first wall 54 and the second wall 56, and FIG. 6 is illustrative of a single actuator 60 that may move the second wall 56 only while the first wall 54 remains stationary or in a fixed location. When one of the first wall 54 or the second wall 56 is fixed, the respective wall 54, 56 is fixed to the housing 50.

As mentioned above, one actuator 60 may be used to move both of the first wall 54 and the second wall 56 (see FIG. 6), or one actuator 60 may be used to move the first wall 54 or the second wall 56 (see FIGS. 6 and 7). When the mass 48 is the fixed mass 48, one actuator 60 may be used to move the mass 48 of FIG. 8 or one actuator 60 may be used to move each of the masses 48 of FIG. 9.

Figure 5:
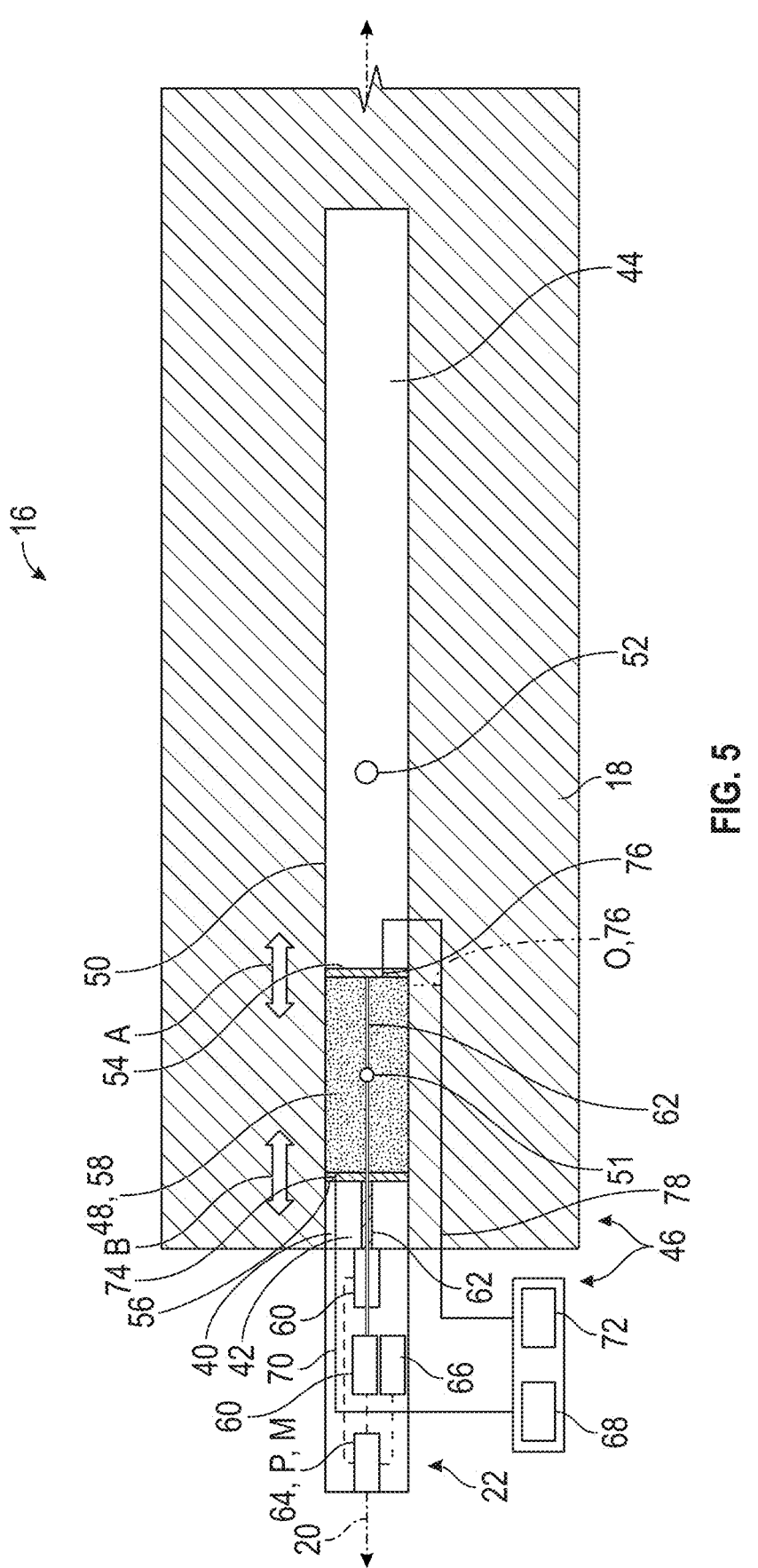
FIG. 5 is a schematic illustration of the blade including another example configuration of the tunable control assembly suitable with the configurations of FIGS. 1 and 2.

In other configurations, a plurality of actuators 60 may be used, in which one of the actuators 60 may move the first wall 54 and another one of the actuators 60 may move the second wall 56 (see FIGS. 3-5). Therefore, in certain configurations, the actuator 60 is defined as a first actuator 60, and the tunable control assembly 46 may optionally include a second actuator 60. It is to be appreciated that any suitable number of actuators 60 may be used, and for example, in FIG. 9, optionally, three actuators 60 may be used such that one actuator 60 is coupled to the respective one of the masses 48 which optionally allows each of the masses 48 to be moved independently of each other. As another example, in FIG. 9, two actuators 60 may be used such that two of the masses 48 are coupled to one of the actuators 60 to move concurrently with each other while the other mass 48 is coupled to another actuator 60 to optionally move independent of the other two masses 48. The actuators 60 may be any suitable configuration, and non-limiting examples may include an electric motor, a solenoid, a hydraulic actuator, an electric actuator, a pneumatic actuator, a linear actuator, etc.

Referring to FIGS. 3-9, the actuator 60 may include a connector 62 disposed inside of the cavity 40 along the longitudinal axis 20. In certain configurations, the connector 62 may be coupled to the first wall 54 and/or the second wall 56 (see FIGS. 3-7). Therefore, in certain configurations, the actuator 60, such as the first actuator 60, has the connector 62, such as a first connector 62, disposed inside of the cavity 40 along the longitudinal axis 20, and the first connector 62 is coupled to or connected to the first wall 54. The first actuator 60 is configured to operate the first connector 62 to move the first wall 54 inside of the cavity 40 to change the volume of the containment area 58 of the mass 48. In other configurations, the connector 62 may be coupled to or connected to the second wall 56, and the actuator 60 may be configured to operate the connector 62 to move the second wall 56 inside of the cavity 40 to change the volume of the containment area 58. The connector 62 may be any suitable configuration, and non-limiting examples may include a jackscrew, a rod, a beam, a truss, an inflatable mandrel, etc.

Figure 8:
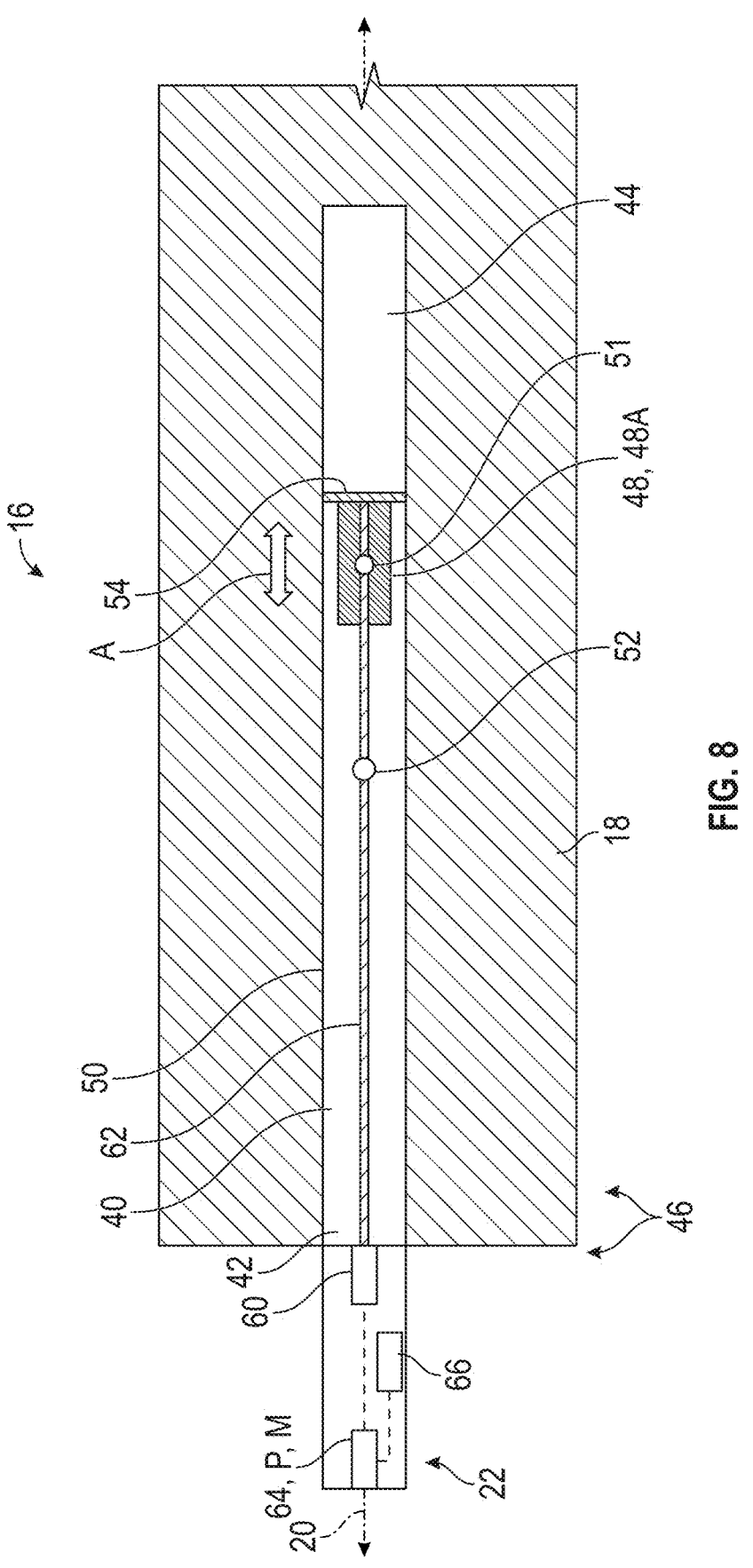
FIG. 8 is a schematic illustration of the blade including yet another example configuration of the tunable control assembly suitable with the configurations of FIGS. 1 and 2, the mass being formed of a different material from the mass of FIGS. 3-7.
Figure 9:
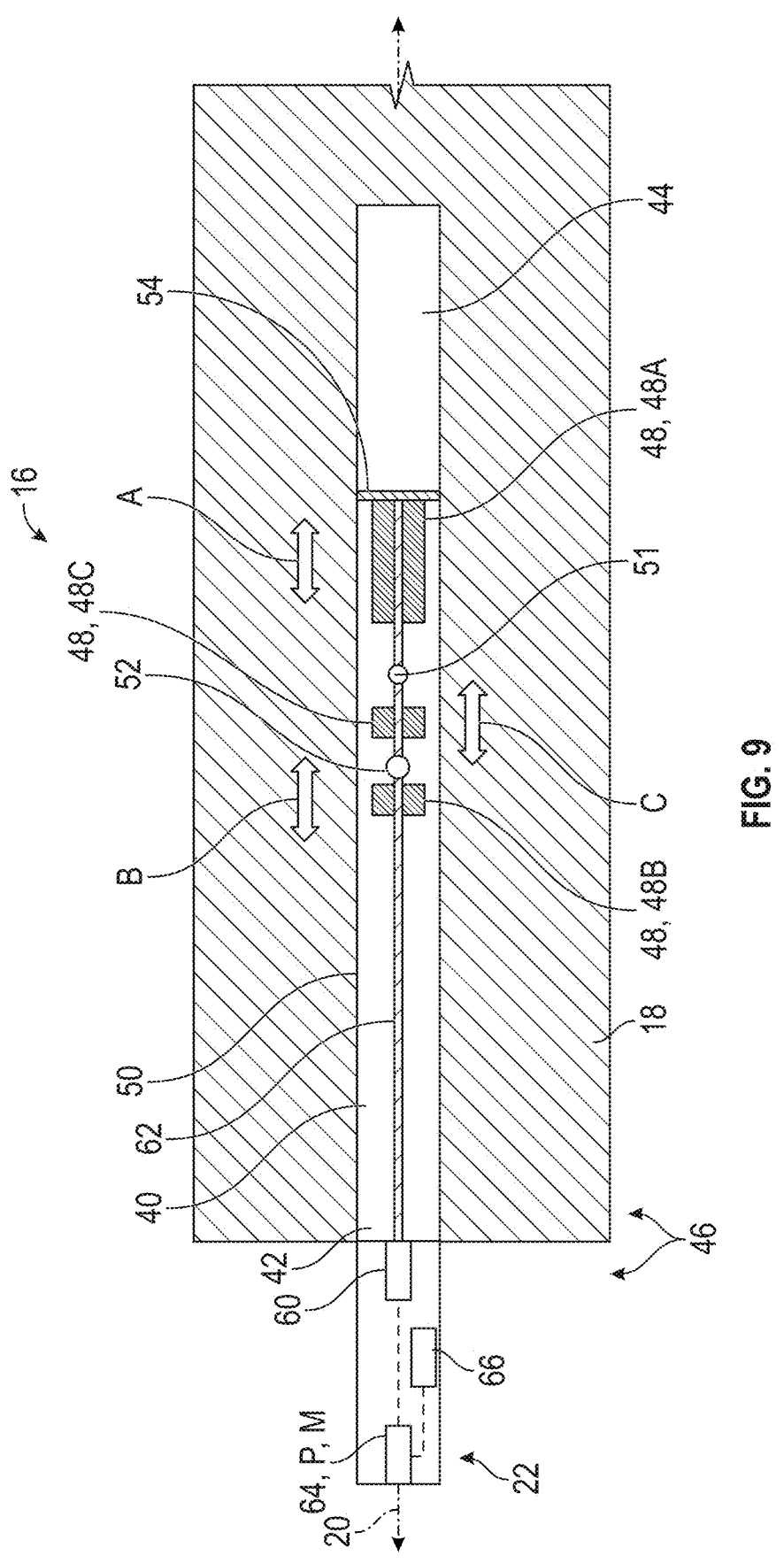
FIG. 9 is a schematic illustration of the blade including another example configuration of the tunable control assembly suitable with the configurations of FIGS. 1 and 2, the mass being a plurality of masses, and the masses being formed of a different material from the mass of FIGS. 3-7.

In other configurations, the connector 62 may be coupled or directly attached to the mass 48, when the mass 48 is the fixed mass 48 (see FIGS. 8 and 9). Optionally, the fixed mass 48 may be coupled to the connector 62 via the first wall 54, or the connector 62 is coupled to or directly attached to the first wall 54. In other configurations, the fixed mass 48 may be coupled to or directly attached to the connector 62 via a container which houses the fixed mass 48. Thus, the fixed mass 48 may be indirectly attached to or connected to the connector 62 via the first wall 54 or the container that houses the fixed mass 48, or the fixed mass 48 may be coupled to or directly attached to or connected to the connector 62 instead of the first wall 54.

When using a plurality of actuators 60, the first actuator 60 having the first connector 62 may be coupled to the first wall 54 and the second actuator 60 having a second connector 62 may be coupled to the second wall 56. When the mass 48 is the liquid fluid, the first actuator 60 may be configured to operate the first connector 62 to move the first wall 54 inside of the cavity 40 to change the volume of the containment area 58, and the second actuator 60 may be configured to operate the second connector 62 to move the second wall 56 inside of the cavity 40 to change the volume of the containment area 58.

In certain configurations, as shown in FIGS. 3 and 4, the first connector 62 and the second connector 62 are separate from each other. The first connector 62 and the second connector 62 may be disposed along the longitudinal axis 20, or in other configurations, the first connector 62 and the second connector 62 may be disposed offset from each other relative to the longitudinal axis 20. As shown in FIGS. 3 and 4, in certain configurations, the first actuator 60 may be disposed proximal to the proximal end 42 of the cavity 40 and the second actuator 60 may be disposed proximal to the distal end 44 of the cavity 40 such that the actuators 60 control separate connectors 62 independently of each other.

In other configurations, as shown in FIG. 5, the first connector 62 and the second connector 62 may be concentric with each other about the longitudinal axis 20, with the first actuator 60 and the second actuator 60 each disposed proximal to the proximal end 42 of the cavity 40 such that the actuators 60 control separate connectors 62 independently of each other.

The tunable control assembly 46 may include a controller 64 to determine when to tune the blade 18, such as, when to activate and deactivate the tunable control assembly 46. Generally, the controller 64 may continuously monitor the blade 18 using various components and data, some examples of which are discussed below. Therefore, the tunable control assembly 46 may include a sensor 66 coupled to the blade 18. The sensor 66 may be configured to detect vibratory load, volume changes in the containment area 58, rotational speed of the blade 18, airspeed, angle of incidence, angle of attack, aerodynamics, and/or detect any other desired data to be used by the controller 64 to determine whether to activate or deactivate the tunable control assembly 46. It is to be appreciated that any suitable number of sensors 66 may be utilized to detect vibratory load, volume changes in the containment area 58, rotational speed of the blade 18, airspeed, angle of incidence, angle of attack, aerodynamics, and/or detect any other desired data to be used by the controller 64. Furthermore, optionally, one or more of the sensors 66 may be coupled to other locations of the structure, i.e., the flight vehicle 11.

The controller 64 is in communication with the sensor(s) 66, the actuator(s) 60, such as the first actuator 60 and the second actuator 60 if using more than one actuator 60. The controller 64 may be configured to activate and deactivate the first actuator 60 and/or the second actuator 60 based on information obtained from the sensor 66. As mentioned above, any suitable number of blades 18 may each include the tunable control assembly 46, and therefore, the controller 64 may communicate with sensors 66 in other blades 18, or each of the blades 18 may have a separate controller 64 and each of the controllers 64 may communicate with each other, and the controller(s) 64 may also use the information obtained from the sensors 66 of the other blades 18. Furthermore, the controller(s) 64 may control the tunable control assembly 46 of each of the blades 18 individually, independently, in a pattern, or one or more simultaneously. The controller(s) 64 may optionally control the tunable control assembly 46 depending on one or more modes of the flight vehicle 11 to determine when to tune the blade 18. The one or more modes may include a flight mode, such as landing, take-off, and cruise, or any other suitable modes.

The controller(s) 64 is configured to execute instructions from a memory M, via a processor P. For example, the controller 64 may be a host machine or distributed system, e.g., a computer such as a digital computer or microcomputer, and, as the memory M, tangible, non-transitory computer-readable memory such as read-only memory (ROM) or flash memory. The controller(s) 64 may also have random access memory (RAM), electrically erasable programmable read-only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller(s) 64 may include all software, hardware, memory M, algorithms, connections, sensors, etc., necessary to control or communicate with, for example, the actuator(s) 60, a pump 68 (detailed below), the sensor(s) 66, the other controllers 64, and flight vehicle systems and controllers. As such, a control method may be embodied as software or firmware associated with the controller(s) 64. It is to be appreciated that the controller(s) 64 may also include any device capable of analyzing data from various sensors, comparing data, making the necessary decisions required to control, analyze, and/or monitor the blade 18, the tunable control assembly 46, and/or the associated features.

When the mass 48 is the liquid fluid, the liquid fluid may be pumped into the containment area 58. Therefore, in certain configurations, the tunable control assembly 46 may include the pump 68 coupled to the cavity 40 via a first fluid line 70. The pump 68 may operate to feed the liquid fluid into the containment area 58. That is, the pump 68 may be configured to adjust the liquid fluid (the mass 48) to the first adjusted mass or the second adjusted mass. The controller 64 may activate the pump 68 based on the determination that the blade 18 is to be tuned, and correspondingly deactivate the pump 68 when the desired tuning is obtained. The pump 68 may be any suitable configuration, and non-limiting examples of the pump 68 may include a fluid pump, hydraulic pump, or any other suitable pump to move the liquid fluid into the containment area 58.

When the controller 64 determines that the amount of mass 48 should be reduced in the containment area 58, the liquid fluid may exit the containment area 58 by being gravity fed, centrifugally fed out of the containment area 58 due to rotation of the blade 18, forced or pushed out of the containment area 58 due to movement of the first wall 54 and/or the second wall 56, or pumped out of the containment area 58 via the pump 68.

Referring to FIGS. 3-7, the tunable control assembly 46 may include a reservoir 72 spaced apart from the blade 18. The reservoir 72 may be configured to store excess liquid fluid away from the cavity 40. Optionally, the reservoir 72 may be disposed proximal to the hub 12.

Continuing with FIGS. 3-7, the tunable control assembly 46 may include an inlet 74 in fluid communication with the pump 68 and an outlet 76 in fluid communication with the reservoir 72. The pump 68 and the reservoir 72 are in fluid communication with each other such that the pump 68 pumps the liquid fluid from the reservoir 72, through the first fluid line 70, and into the containment area 58 of the cavity 40 via the inlet 74. The outlet 76 is spaced apart from the inlet 74, and the outlet 76 is in fluid communication with the containment area 58 of the cavity 40. The outlet 76 is coupled to the containment area 58 and the reservoir 72 via a second fluid line 78.

In certain configurations, the inlet 74 may be defined through the second wall 56, and the outlet 76 may be defined through the first wall 54. In other configurations, the outlet 76 may be defined through the housing 50, which is illustrated via the different exit location of the second fluid line 78 as the dash-dot-dot-dash line O in FIGS. 3-7. That is, the exit of the second fluid line 78, O may be disposed through a side of the housing 50. It is to be appreciated that, in certain configurations, the inlet 74 and the outlet 76 may be reversed such that the outlet 76 is disposed where the inlet 74 is in the figures, and the inlet 74 is disposed where the outlet 76 is in the figures. Furthermore, it is to be appreciated that the inlet 74 and/or the outlet 76 may be disposed through the side of the housing 50, and generally, the dash-dot-dot-dash line O in FIGS. 3-7 may be representative of fluid communication through the side of the housing 50.

Turning to FIGS. 8 and 9, the mass 48 is formed of the fixed mass having a constant weight, i.e., non-variable volume. That is, the weight of the mass 48 is the same, i.e., does not change, for the configurations of FIGS. 8 and 9. In the configurations of FIGS. 8 and 9, the mass 48 may be formed of the solid mass and/or the liquid mass but having the constant weight, i.e., the weight is not changeable.

In these configurations of FIGS. 8 and 9, the mass 48 is adjustable by moving the mass 48 toward the tip end 24 of the blade 18, or the mass 48 is adjustable by moving the mass 48 toward the root end 22 of the blade 18. That is, the fixed mass 48 is movable back and forth inside of the blade 18. Arrow A in FIG. 8 is illustrative of the example directions of movement of the mass 48.

Continuing with the configurations of FIGS. 8 and 9, the actuator 60, such as the first actuator 60, is coupled to the mass 48 to move the fixed mass 48. The first actuator 60 may include the first connector 62 coupled to the mass 48, and the first actuator 60 is configured to operate the first connector 62 to move the mass 48 inside of the cavity 40. Again, as discussed above, the first actuator 60 may operate to move the mass 48 during flight of the flight vehicle 11. Movement of the mass 48 inside of the cavity 40 changes the center of gravity 51 of the mass 48 and correspondingly changes the center of gravity 52 of the blade 18. Therefore, the blade 18 may be tuned in flight, which may remove or reduce the occurrence of imbalanced loads and vibratory loads.

In certain configurations, a plurality of masses 48 may be used, as shown in FIG. 9. Therefore, in this configuration, the mass 48 may include a first mass portion 48A having the constant weight and a second mass portion 48B having a constant weight, and if the mass 48 includes a third mass portion 48C, the third mass portion 48C has a constant weight, and so on for the number of masses 48 being utilized. The masses 48 may each be the same weight as each other, each may be a different weight from each other, or one or more of the masses 48 may be a different weight from one or more of the other masses 48, and therefore, as shown in FIG. 9 for illustrative purposes, the first mass portion 48A is a different weight than the second mass portion 48B and the third mass portion 48C.

Any suitable number of actuators 60, and corresponding connectors 62, may be used to move the plurality of masses 48. Therefore, in certain configurations, one actuator 60 may be used to move the plurality of the masses 48, such as the first mass portion 48A and the second mass portion 48B (and the third mass portion 48C if the mass 48 includes the third mass portion 48C). In other configurations, a plurality of actuators 60, such as the first actuator 60 and the second actuator 60, may be used to move the first mass portion 48A and the second mass portion 48B, and if utilizing the third mass portion 48C, a third actuator 60 may be used to move the third mass portion 48C. Alternatively, one of the actuators 60 may be coupled to one or more mass portions 48A-48C and another one of the actuators 60 may be coupled to one or more other mass portions 48A-48C such that some of the masses 48 are movable concurrently with each other in response to actuation of one of the actuators 60. As such, generally, if utilizing two masses 48, the first mass portion 48A and the second mass portion 48B may be movable concurrently with each other or movable independently of each other via operation of the first actuator 60 and the second actuator 60 respectively. Arrows A, B, and C in FIG. 9 are illustrative of the example directions of movement of the masses 48 (i.e., the first mass portion 48A, the second mass portion 48B, and the third mass portion 48C).

Optionally, the first mass portion 48A is coupled to the first connector 62 via the first actuator 60, and the second mass portion 48B is coupled to the second actuator 60 via the second connector 62. The second actuator 60 is configured to operate the second connector 62 to move the second mass portion 48B inside of the cavity 40. Therefore, if utilizing two connectors 62 for the configuration of FIG. 9, optionally, one of the actuators 60 may be disposed proximal to the proximal end 42 of the cavity 40 and another one of the actuators 60 may be disposed proximal to the distal end 44 of the cavity 40 as shown in FIGS. 3 and 4. Furthermore, if using two connectors 62 for the configuration of FIG. 9, both of the actuators 60 may be disposed proximal to the proximal end 42 of the cavity 40 as shown in FIG. 5. Therefore, in certain configurations, the first connector 62 and the second connector 62 may be concentric with each other about the longitudinal axis 20 for the configuration of FIG. 9.

In the configurations of FIGS. 8 and 9, the sensor(s) 66 and the controller(s) 64 as discussed above may be utilized to adjust the fixed mass(es) 48. The sensor 66 may be configured to detect vibratory load, changes of the location of the mass(es) 48 in the containment area 58, rotational speed of the blade 18, airspeed, angle of incidence, angle of attack, aerodynamics, and/or detect any other desired data to be used by the controller 64 to determine whether to activate or deactivate the tunable control assembly 46. It is to be appreciated that any suitable number of sensors 66 may be utilized to detect vibratory load, changes in the location of the mass(es) 48, rotational speed of the blade 18, airspeed, angle of incidence, angle of attack, aerodynamics, and/or detect any other desired data to be used by the controller 64. Furthermore, optionally, one or more of the sensors 66 may be coupled to other locations of the structure, i.e., the flight vehicle 11.

The controller 64 is in communication with the sensor(s) 66, the actuator(s) 60, such as the first actuator 60 and the second actuator 60 if using more than one actuator 60. The controller 64 may be configured to activate and deactivate the first actuator 60 and/or the second actuator 60 based on information obtained from the sensor 66. As mentioned above, any suitable number of blades 18 may each include the tunable control assembly 46, and therefore, the controller 64 may communicate with sensors 66 in other blades 18, or each of the blades 18 may have a separate controller 64 and each of the controllers 64 may communicate with each other, and the controller(s) 64 may also use the information obtained from the sensors 66 of the other blades 18. Furthermore, the controller(s) 64 may control the tunable control assembly 46 of each of the blades 18 individually, independently, in a pattern, or one or more simultaneously. The controller(s) 64 may optionally control the tunable control assembly 46 depending on one or more modes of the flight vehicle 11 to determine when to tune the blade 18. The one or more modes may include a flight mode, such as landing, take-off, and cruise, or any other suitable modes.

The present disclosure also provides a method of controlling vibration of the tunable blade assembly 10 for the flight vehicle 11. The method may be implemented before take-off when the flight vehicle 11 is starting up or warming up, or after the flight vehicle 11 has landed when the flight vehicle 11 is shutting down rotation of the blades 18, or may be implemented during any modes of flight of the flight vehicle 11. By tuning the blade 18 during operation of the flight vehicle 11, vibration may be controlled.

Generally, vibration of the blade 18 is determined, via the controller 64 (using data from the sensor(s) 66), in response to rotation of the blade 18 via the hub 12. As discussed above, the blade 18 extends along the longitudinal axis 20 between the root end 22 and the tip end 24 spaced from the hub 12. The hub 12 and the blade 18 are rotatable about the central axis 14. In certain configurations, the longitudinal axis 20 is transverse to the central axis 14. As also discussed above, the blade 18 is coupled to the hub 12 at the root end 22, and the blade 18 defines the cavity 40 spaced from the tip end 24.

The controller 64 determines if a threshold of the vibration is reached. More specifically, the threshold may be reached when vibration of the blade 18 approaches or coincides with the natural frequency of the blade 18. Vibration of the blade 18 may be excessive if the rotating speed and/or excitation of the blade 18 approaches or coincides with the natural frequency of the blade 18, i.e., the resonant frequency. Therefore, the tunable blade assembly 10 and the method described herein controls vibration of the blade 18 to prevent excessive vibration of the blade 18, such as changing the resonant frequency, which may beneficially provide improved performance, increase the structural life of the blade 18, and/or improve passenger ride experience of the structure, such as the flight vehicle 11. As such, the blade 18 may be tuned to change the natural frequency and reduce vibrations.

The controller 64 activates the actuator 60 in response to the threshold of the vibration being reached. Also, the controller 64 activates the pump 68 in response to the threshold of the vibration being reached. The controller 64 activates the actuator(s) 60 until the new (different) natural frequency of the blade 18 is reached. Once the new (different) natural frequency of the blade 18 is reached, the controller signals the actuator(s) 60 to deactivate. As discussed above, the controller 64 may activate and deactivate one or more actuators 60, depending on the configuration of the tunable control assembly 46, in which the mass 48 may be adjustable by increasing the mass 48 inside of the cavity 40 or decreasing the mass 48 inside of the cavity 40, which is illustrated in FIGS. 3-7, and/or the mass 48 may be adjustable by moving the mass 48 to different locations inside of the cavity 40, which is illustrated in FIGS. 3-9. Therefore, depending on the desired configuration of the tunable control assembly 46, the location of the mass 48 may be changed, the amount of mass 48 may be changed, or the location of the mass 48 and the amount of mass 48 may both be changed, in order to tune the blade 18. As discussed above, the mass(es) 48 is adjusted inside of the cavity 40 of the blade 18, via the actuator(s) 60, to reduce vibrations in the blade 18 due to rotation of the blade 18 via the hub 12 and corresponding excitation of the blade 18. Details of the features used to adjust the mass 48 are discussed above.

As mentioned above, by changing the center of gravity 51 of the mass 48, the center of gravity 52 of the blade 18 may be changed, which, generally, changes the natural frequency of the blade 18. General examples of the change of the frequency are discussed next for illustrative purposes. For example, adjusting the mass 48 may include increasing the mass 48 inside of the cavity 40 which decreases a natural frequency of the blade 18. As another example, adjusting the mass 48 may include decreasing the mass 48 inside of the cavity 40 which increases the natural frequency of the blade 18. As yet another example, adjusting the mass 48 may include moving the mass 48 toward the tip end 24 of the blade 18 which decreases the natural frequency of the blade 18. As another example, adjusting the mass 48 may include moving the mass 48 toward the root end 22 of the blade 18 which increases the natural frequency of the blade 18. Adjustments of the mass(es) 48 inside of the cavity 40 may change the center of gravity 51 of the mass 48 and may change the center of gravity 52 of the blade 18. Therefore, the blade 18 may be tuned in flight, which may beneficially remove or reduce the occurrence of imbalanced loads and vibratory loads.

It is to be appreciated that the order or sequence of performing the method as discussed above is for illustrative purposes and other orders or sequences are within the scope of the present teachings. It is to also be appreciated that the method may include other features not specifically identified in the discussion immediately above.

While the best modes and other configurations for carrying out the disclosure have been described in detail, those familiar with the art to which this disclosure relates will recognize various alternative designs and configurations for practicing the disclosure within the scope of the appended claims. Furthermore, the configurations shown in the drawings or the characteristics of various configurations mentioned in the present description are not necessarily to be understood as configurations independent of each other. Rather, it is possible that each of the characteristics described in one of the examples of a configuration can be combined with one or a plurality of other desired characteristics from other configurations, resulting in other configurations not described in words or by reference to the drawings. Accordingly, such other configurations fall within the framework of the scope of the appended claims.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

The following Clauses provide some example configurations of the tunable blade assembly 10, the blade assembly 16, and the method as disclosed herein.

Clause 1: A tunable blade assembly for a flight vehicle, the tunable blade assembly comprising: a hub rotatable about a central axis; a blade extending along a longitudinal axis between a root end and a tip end, with the tip end spaced from the hub, wherein the longitudinal axis is transverse to the central axis, wherein the blade is coupled to the hub at the root end such that the blade is rotatable concurrently with the hub and rotation of the blade generates vibrations in the blade, wherein the blade defines a cavity spaced from the tip end; and a tunable control assembly including a mass adjustable inside of the cavity of the blade to reduce the vibrations in the blade.

Clause 2: The tunable blade assembly as set forth in clause 1 wherein: the mass is adjustable by increasing the mass inside of the cavity to a first adjusted mass; or the mass is adjustable by decreasing the mass inside of the cavity to a second adjusted mass.

Clause 3: The tunable blade assembly as set forth in clauses 1 or 2 wherein: the tunable control assembly includes a first wall disposed inside of the cavity to define a first boundary of the cavity that houses the mass; the tunable control assembly includes a second wall disposed inside of the cavity to define a second boundary of the cavity that houses the mass; and the first wall and the second wall are spaced apart from each other to define a containment area, and the mass is disposed between the first wall and the second wall in the containment area.

Clause 4: The tunable blade assembly as set forth in any one of the preceding clauses wherein the first wall is stationary, and the second wall is movable relative to the first wall to change a volume of the containment area to accommodate the first adjusted mass or the second adjusted mass.

Clause 5: The tunable blade assembly as set forth in any one of the preceding clauses wherein: the tunable control assembly includes an actuator having a connector coupled to the second wall; and the actuator is configured to operate the connector to move the second wall inside of the cavity to change the volume of the containment area.

Clause 6: The tunable blade assembly as set forth in any one of clauses 1-3 wherein the first wall and the second wall are movable relative to each other to change a location of the first boundary and a location of the second boundary inside of the cavity to change a volume of the containment area to accommodate the first adjusted mass or the second adjusted mass.

Clause 7: The tunable blade assembly as set forth in any one of clauses 1-3, or 6 wherein: the tunable control assembly includes a first actuator having a first connector coupled to the first wall; the first actuator is configured to operate the first connector to move the first wall inside of the cavity to change the volume of the containment area; the tunable control assembly includes a second actuator having a second connector coupled to the second wall; and the second actuator is configured to operate the second connector to move the second wall inside of the cavity to change the volume of the containment area.

Clause 8: The tunable blade assembly as set forth in any one of the preceding clauses wherein: the tunable control assembly includes a sensor coupled to the blade; the tunable control assembly includes a controller in communication with the sensor, the first actuator, and the second actuator; and the controller is configured to activate and deactivate the first actuator and/or the second actuator based on information obtained from the sensor.

Clause 9: The tunable blade assembly as set forth in clause 7 wherein the first connector and the second connector are concentric with each other about the longitudinal axis.

Clause 10: The tunable blade assembly as set forth in any one of the preceding clauses wherein the mass is formed of an adjustable mass in which a weight of the adjustable mass is adjustable.

Clause 11: The tunable blade assembly as set forth in any one of the preceding clauses wherein: the adjustable mass is formed of a liquid fluid; the tunable control assembly includes a pump coupled to the cavity via a first fluid line and the pump is configured to adjust the liquid fluid to the first adjusted mass; the tunable control assembly includes a reservoir spaced apart from the blade; and the reservoir is configured to store excess liquid fluid away from the cavity.

Clause 12: The tunable blade assembly as set forth in any one of the preceding clauses wherein: the tunable control assembly includes an inlet in fluid communication with the pump and an outlet in fluid communication with the reservoir; and the pump and the reservoir are in fluid communication with each other such that the pump pumps the liquid fluid from the reservoir, through the first fluid line, and into the containment area of the cavity via the inlet.

Clause 13: The tunable blade assembly as set forth in any one of the preceding clauses wherein: the cavity extends along the longitudinal axis between a proximal end and a distal end; the proximal end is disposed closer to the root end of the blade than the proximal end is to the tip end of the blade; the distal end is disposed closer to the tip end of the blade than the distal end is to the root end of the blade; and the outlet is spaced apart from the inlet and the outlet is in fluid communication with the containment area of the cavity.

Clause 14: The tunable blade assembly as set forth in any one of the preceding clauses wherein the inlet is defined through the second wall.

Clause 15: The tunable blade assembly as set forth in any one of the preceding clauses wherein the outlet is defined through the first wall.

Clause 16: The tunable blade assembly as set forth in clause 1 wherein: the mass is adjustable by moving the mass toward the tip end of the blade; or the mass is adjustable by moving the mass toward the root end of the blade.

Clause 17: The tunable blade assembly as set forth in one of clauses 1 or 16 wherein: the tunable control assembly includes a first actuator having a first connector coupled to the mass; and the first actuator is configured to operate the first connector to move the mass inside of the cavity.

Clause 18: The tunable blade assembly as set forth in one of clauses 1, 16, or 17 wherein the mass is formed of a fixed mass having a constant weight.

Clause 19: The tunable blade assembly as set forth in one of clauses 1 or 16-18 wherein: the mass includes a first mass portion having the constant weight and a second mass portion having a constant weight; the first mass portion is coupled to the first connector; the tunable control assembly includes a second actuator having a second connector coupled to the second mass portion, and the second actuator is configured to operate the second connector to move the second mass portion inside of the cavity; and the first mass portion and the second mass portion are movable concurrently with each other or movable independently of each other via operation of the first actuator and the second actuator respectively.

Clause 20: The tunable blade assembly as set forth in one of clauses 1 or 16-19 wherein the first connector and the second connector are concentric with each other about the longitudinal axis.

Clause 21: The tunable blade assembly as set forth in one of clauses 1 or 16-19 wherein: the tunable control assembly includes a sensor coupled to the blade; the tunable control assembly includes a controller in communication with the sensor, the first actuator, and the second actuator; and the controller is configured to activate and deactivate the first actuator and/or the second actuator based on information obtained from the sensor.

Clause 22: The tunable blade assembly as set forth in any one of the preceding clauses wherein: the blade includes a leading edge and a trailing edge spaced apart from each other relative to a chord axis that is transverse to the longitudinal axis; and the blade includes a spar having the cavity disposed in the spar.

Clause 23: The tunable blade assembly as set forth in one of clauses 1-16 or 22 wherein: the tunable control assembly includes a first wall disposed inside of the cavity to define a first boundary of the cavity that houses the mass; the tunable control assembly includes a first actuator having a first connector disposed inside of the cavity along the longitudinal axis, and the first connector is coupled to the first wall; and the first actuator is configured to operate the first connector to move the first wall inside of the cavity to change a volume of a containment area of the mass.

Clause 24: A blade assembly coupled to a hub of a flight vehicle, the blade assembly comprising: a blade extending along a longitudinal axis between a root end and a tip end spaced from the root end, wherein the blade is configured to rotate concurrently with the hub and rotation of the blade generates vibrations in the blade, wherein the blade defines a cavity spaced from the tip end; and a tunable control assembly including a mass adjustable inside of the cavity of the blade to reduce the vibrations in the blade.

Clause 25: A method of controlling vibration of a tunable blade assembly for a flight vehicle, the method comprising: determining, via a controller, the vibration of a blade of the tunable blade assembly in response to rotation of the blade via a hub, wherein the blade extends along a longitudinal axis between a root end and a tip end, with the tip end spaced from the hub, wherein the hub and the blade are rotatable about a central axis, wherein the longitudinal axis is transverse to the central axis, wherein the blade is coupled to the hub at the root end, wherein the blade defines a cavity spaced from the tip end; determining, via the controller, if a threshold of the vibration is reached; activating, via the controller, an actuator in response to the threshold of the vibration being reached; and adjusting a mass inside of the cavity of the blade, via the actuator, to reduce the vibration of the blade.

Clause 26: The method as set forth in clause 25 wherein adjusting the mass further comprises increasing the mass inside of the cavity which decreases a natural frequency of the blade.

Clause 27: The method as set forth in clause 25 wherein adjusting the mass further comprises decreasing the mass inside of the cavity which increases a natural frequency of the blade.

Clause 28: The method as set forth in clause 25 wherein adjusting the mass further comprises moving the mass toward the tip end of the blade which decreases a natural frequency of the blade.

Clause 29: The method as set forth in clause 25 wherein adjusting the mass further comprises moving the mass toward the root end of the blade which increases a natural frequency of the blade.

What is claimed is:

1. A blade assembly coupled to a hub of a flight vehicle, the blade assembly comprising:
a blade extending along a longitudinal axis between a root end and a tip end spaced from the root end, wherein:
the blade is configured to rotate concurrently with the hub and rotation of the blade generates vibrations in the blade, and
the blade defines a cavity spaced from the tip end; and
a tunable control assembly including a mass adjustable inside of the cavity of the blade to reduce the vibrations in the blade, wherein the mass is structured to enable adjustment of a weight of the mass in flight.

2. The blade assembly of claim 1, wherein the mass includes liquid in a containment area, the blade assembly including:
a first fluid line in fluid communication with an inlet to the containment area;
a second fluid line in fluid communication with an outlet from the containment area;
a pump in fluid communication with the first fluid line; and
a reservoir in fluid communication with the second fluid line, the pump to adjust the weight of the mass by pumping the liquid from the reservoir, through the first fluid line, and into the containment area via the inlet.

3. The blade assembly of claim 1, wherein the mass is adjustable by changing a location of the mass inside the cavity.

4. The blade assembly of claim 1, wherein the mass is adjustable by changing a center of gravity of the mass.

5. The blade assembly of claim 4, wherein the mass includes a first mass portion and a second mass portion, the blade assembly including one or more actuators coupled to the first mass portion and the second mass portion, the one or more actuators to move the first mass portion independent of the second mass portion to change the center of gravity of the mass.

6. The blade assembly of claim 1, including:
one or more sensors to generate measurement data of at least one of a vibratory load, a change of a location of the mass inside the cavity, a rotational speed of the blade, an airspeed, an angle of incidence, an angle of attack, or aerodynamics; and
a controller in communication with the sensors, the controller to activate and deactivate the tunable control assembly to adjust the mass based on the measurement data.

7. A blade assembly coupled to a hub of a flight vehicle, the blade assembly comprising:
a blade extending along a longitudinal axis between a root end and a tip end spaced from the root end, wherein:
the blade is configured to rotate concurrently with the hub and rotation of the blade generates vibrations in the blade, and
the blade defines a cavity spaced from the tip end; and
a tunable control assembly including a mass adjustable inside of the cavity of the blade to reduce the vibrations in the blade, wherein a weight of the mass is adjustable, wherein the mass includes liquid in a containment area, the blade assembly including:
a first fluid line in fluid communication with an inlet to the containment area;

a second fluid line in fluid communication with an outlet from the containment area;

a pump in fluid communication with the first fluid line; and a reservoir in fluid communication with the second fluid line, the pump to adjust the weight of the mass by pumping the liquid from the reservoir, through the first fluid line, and into the containment area via the inlet.

\* \* \* \* \*